United States Patent [19]

Hamada et al.

[11] Patent Number: 4,786,929
[45] Date of Patent: Nov. 22, 1988

[54] SINGLE LENS REFLEX CAMERA

[75] Inventors: Hisashi Hamada, Tokyo; Michihiro Shiina, Saitama, both of Japan

[73] Assignee: Fuji Photo Film Co., Ltd., Kanagawa, Japan

[21] Appl. No.: 111,155

[22] Filed: Oct. 19, 1987

[30] Foreign Application Priority Data

Oct. 17, 1986 [JP] Japan .............................. 61-246976
Oct. 20, 1986 [JP] Japan .............................. 61-249200

[51] Int. Cl.⁴ .............................................. G03B 19/12
[52] U.S. Cl. .................................................... 354/154
[58] Field of Search ................ 354/152, 153, 154, 156

[56] References Cited

U.S. PATENT DOCUMENTS

| | | | |
|---|---|---|---|
| 3,089,399 | 5/1963 | Daeche | 354/154 |
| 3,165,042 | 1/1965 | Higuchi | 354/154 |
| 4,498,750 | 2/1985 | Suzuki et al. | 354/154 |

Primary Examiner—Donald A. Griffin
Attorney, Agent, or Firm—Young & Thompson

[57] ABSTRACT

A single lens reflex camera having a reflex mirror and a light-blocking plate mounted therein for pivotal movement as a unit between a viewing and a photographing position. A driving mechanism is provided, having an electric motor for causing the pivotal movement of the reflex mirror and light-blocking plate. A manually operable mirror swing-up member causes the driving mechanism to swing up the reflex mirror and the plate to the photographing position. A switching member is operated at the beginning of the operation of detaching a taking lens from the camera and causes the driving mechanism to swing the mirror and plate down so as to place the reflex mirror and the light-blocking plate in the viewing position even though the mirror swing-up member has been operated.

4 Claims, 5 Drawing Sheets

SINGLE LENS REFLEX CAMERA

BACKGROUND OF THE INVENTION

The present invention relates to a single lens reflex camera on which a taking lens unit and a camera back are detachably mounted, and more particularly relates to a single lens reflex camera with a reflex mirror which is controlled by a mirror controller to move between a viewing position wherein the reflex mirror is disposed in the photographic light path and a photographing position wherein the reflex mirror is out of the photographic light path.

As commercial or semiprofessional single lens reflex cameras of the type having a large format, various single lens reflex cameras having lens-shutter assemblies are well known in the art. One such type of single lens reflex camera generally comprises a camera body, a taking lens unit incorporating a lens-shutter assembly detachably mounted on the camera body, and a film magazine or camera back also detachably mounted on the camera body. Some of these large format single lens reflex cameras are adapted to swing and tilt by the aid of a bellows connected between the taking lens unit and the camera body.

Single lens reflex cameras have a swingable reflex mirror for reflecting light from a subject to a focusing screen of a viewing system. The reflex mirror is adapted to swing up to a photographing position wherein the reflex mirror is out of the photographic light path of the camera to allow a film in the camera to be exposed to the light passing through the taking lens. In such a large format single lens reflex camera, because the shutter is open when the reflex mirror is in the viewing position, it is necessary to provide the camera body with a light-blocking plate which is swingable up and down in cooperation with the mirror and isolates the film in the camera from any light in the viewing position.

As the reflex mirror of a single lens reflex camera is adapted to swing up rapidly immediately before an exposure is made, vibrations are produced in the camera. These vibrations detract from the quality of the photographed images, in particular images photographed under extreme conditions. Another problem in such single lens reflex cameras is that the reflex mirror interferes with some kinds of lenses, for example by having long back flanges where they are attached to the camera. To avoid these problems, such a single lens reflex camera can be provided with a manually operable mirror swing-up device which swings up and holds the reflex mirror in the photographing position, independently from ordinary photographic sequential operations.

The single lens reflex camera of the type having a lens-shutter assembly generally has the problem that because of the lens-shutter assembly, the film will be accidentally exposed to light when the reflex mirror and light-blocking plate are moved up to the photographic position with the taking lens detached from the camera.

To avoid this problem, the reflex mirror and light-blocking plate can be arranged to be moved to the viewing position if the taking lens is detached from the camera. In this way, accidental exposure can be reliably prevented when exchanging taking lenses. However, this is made possible only by using specially made interchangeable taking lenses. For this reason, the camera cannot use lenses which are not systematized, such as lenses having large flange backs, and the camera is impossible to demonstrate by swinging up and down the reflex mirror with no taking lens mounted thereon.

OBJECT OF THE INVENTION

It is an object of the present invention to provide a single lens reflex camera of the type having a lens-shutter assembly, in which the reflex mirror can be manually operated to swing up and down without accidental exposure of a film loaded therein.

It is another object of the present invention to provide a single lens reflex camera in which the reflex mirror can be operated in any desired way with no accidental exposure of the film.

SUMMARY OF THE INVENTION

According to the present invention, a single lens reflex camera of the type having a lens-shutter assembly is provided with mirror swing-up means manually operated for selectively swinging up a reflex mirror and a light-blocking plate, switching means operated at the beginning of the operation of detaching a taking lens from the camera, and a mirror driving mechanism for swinging up and down the reflex mirror and the light-blocking plate according to the operating conditions of both the mirror swing-up means and the switch means. After the mirror swing-up means has been operated to cause the mirror driving mechanism to swing up and thereby place the reflex mirror and the light-blocking plate in the photographing position, the mirror driving mechanism is quickly actuated to swing down and thereby place the reflex mirror and the light-blocking plate in the viewing position upon operation of the switch means.

In accordance with a preferred embodiment of the present invention, the switching means is adapted to be maintained operated unless a taking lens is mounted on the camera. Thanks to the switching means being thus constructed, the mirror driving mechanism is prevented from operating even though the mirror swing-up means is operated, whereby the reflex mirror and the light-blocking plate are maintained in the viewing position.

In accordance with another preferred embodiment of the present invention, the single lens reflex camera cooperates with a film magazine or camera back having a light-blocking cover plate for opening and closing an exposure opening thereof. For detecting whether the light-blocking cover plate covers the exposure opening of the camera back mounted on the camera, the camera back is provided with detecting means. The mirror driving mechanism, when the detecting means detects that the light-blocking cover plate closes the exposure opening, can be operated according to operations of the mirror swing-up means independently of operation of the switching means and, on the other hand, when the detecting means detects the light-blocking cover plate opening the exposure opening, can swing down and place the reflex mirror and the light-blocking plate in the viewing position independently of an operation of the mirror swing-up means.

In any embodiment, the mirror driving mechanism includes an electric motor which is electrically controlled by signals from the switching means, mirror swing-up means, and detecting means to swing up and down the reflex mirror and the light-blocking plate.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
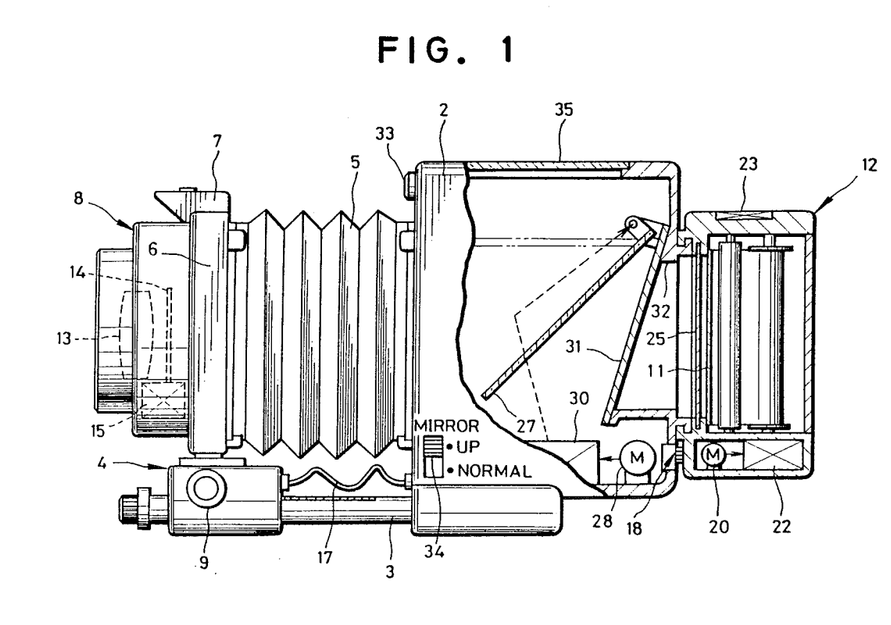
FIG. 1 is a schematic side elevational view, with parts broken away, showing a preferred embodiment of a single lens reflex camera according to the present invention.

Referring to FIG. 1 showing schematically a single lens reflex camera of the type having a lens shutter, in which the present invention is embodied, there is shown therein a camera body 2 which is provided with a pair of guide rods 3 extending forwardly from the front of the bottom thereof. Slidably mounted on the pair of guide rods 3 is a locating unit 4 having a lens board 6, attached to which is a lens unit 8 on the front side and a bellows 5 on the rear side thereof. The lens unit 8 is detachably mounted on the lens board 6 by means of a hook 7 disposed at the top of the lens board 6. The locating unit 4 is provided with a knob 9 which is operated to cause an axial movement of the lens board 6 so as to focus an image on a film 11 held in a film magazine or camera back 12 detachably mounted on the back of the camera body 2.

The lens unit 8 incorporates therein a taking lens 13, a shutter 14, and a shutter driving device 16 (see FIG. 5) with its associated shutter control circuit 15. An electrical connection is made between the lens unit 8 and the lens board 6 in any well known manner when these two are attached. The lens unit 8, on the other hand, is electrically connected to the camera body 2 through a flexible cord 17.

The camera body 12 is, as is well known to those skilled in the art, electrically connected to the camera body 2 through contact arrangement 18 upon the mounting of the camera back 12. In the camera back 12 there is incorporated a film advancing motor 20 with its associated control circuit 21 (see FIG. 5) and a film advancing mechanism 22 of which the operations are sequentially controlled by the aid of electrical signals from the camera body 2. The camera back 12 is provided with a light-blocking plate 25 removably inserted so as to close an opening formed in the front wall of the camera back 12 in order to prevent the film being accidentally exposed when the camera back 12 is detached from the camera body 2. Provided on the top wall of the camera back 12 is a liquid crystal display panel 23 for displaying an exposed number, warning signs, and so on.

Figure 5:
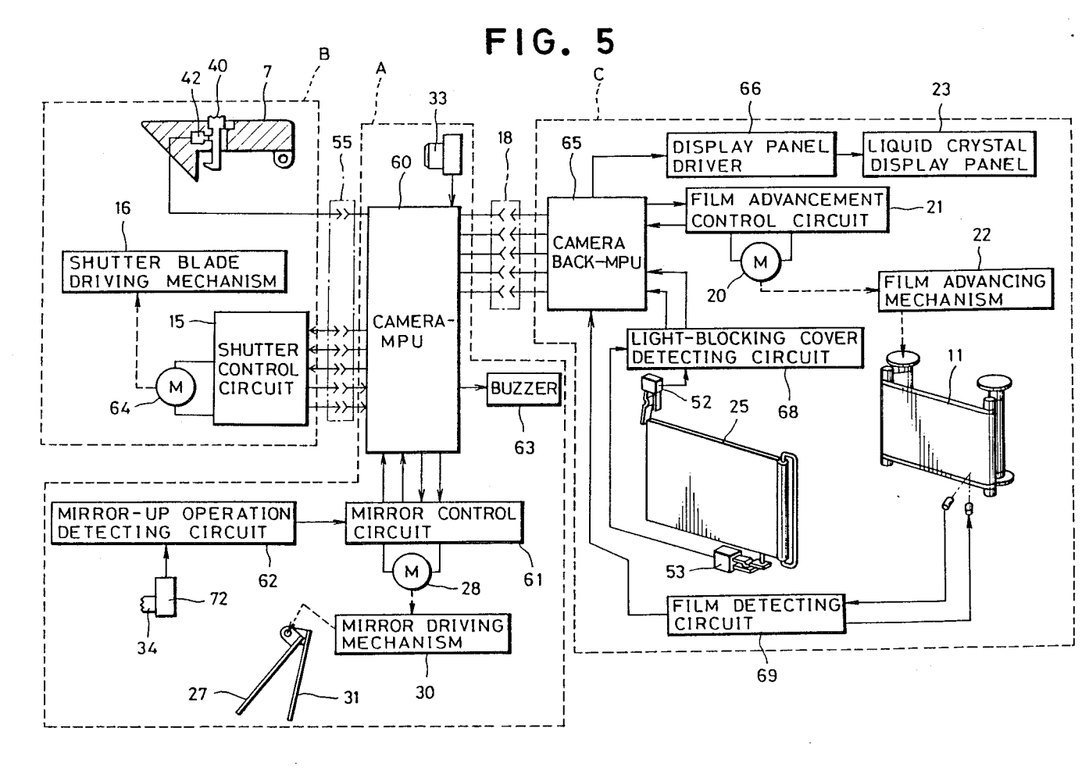
FIG. 5 is a block diagram showing a circuit configuration incorporated in the single lens reflex camera of FIG. 1.

In the camera body 2 there is a reflex mirror 27 movable between a down position shown by a solid line and an up position shown by a double dotted line, which is moved up and down by means of a mirror driving mechanism 30 and a motor 28 controlled by a motor control circuit 29 (see FIG. 5). There is also a light-blocking plate 31 which is moved up and down in cooperation with the mirror 27 and by the mirror driving mechanism 30 to open and close an opening 32 formed in the back of the camera body 2. Specifically, when the reflex mirror 27 is moved up, the light-blocking plate 31 is cooperatively moved up to open the opening 32 so as to permit light to travel toward the film in the camera back 12 and, on the other hand, when the reflex mirror 27 is moved down, the light-blocking plate 31 is simultaneously moved down to block the opening 32 so as to prevent light from entering the camera back 12. The up-and-down movement of the reflex mirror 27 and the light shielding plate 31 is controlled by the aid of a sequential control program which is initiated by depressing a shutter release button 33. Apart from the shutter release button 33, there is a mirror operating button 34 which is manually operated to move up the reflex mirror 27 and the light shielding plate 31.

Figure 2:
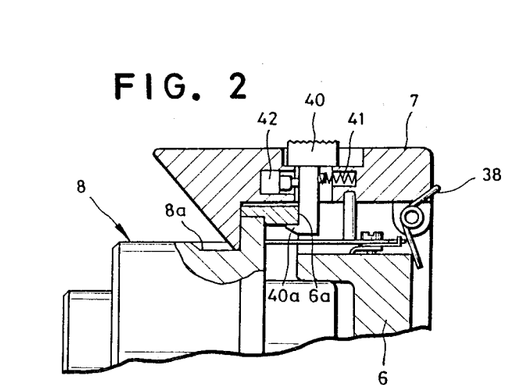
FIG. 2 is a partially sectional schematic illustration showing a lens unit mounting mechanism.
Figure 3:
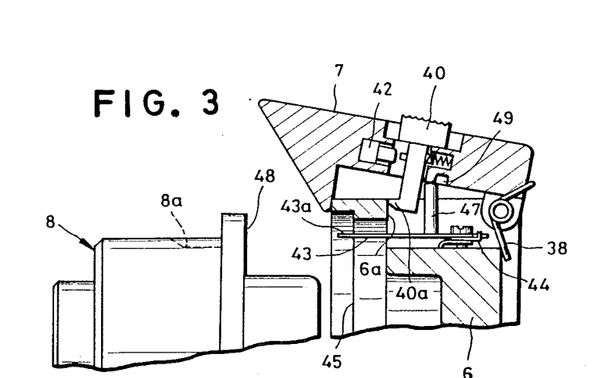
FIG. 3 is a partially sectional schematic illustration similar to FIG. 2 but with the lens unit detached.

Reference is now had to FIGS. 2 and 3 showing a lens unit mounting mechanism. The hook 7 is pivotally mounted on the lens board 6 and is urged by a spring 38 to turn in the counterclockwise direction. For mounting the lens unit 8, the lens unit 8 at its bottom is at first engaged with a shoe formed at the bottom of the lens board 6 and then a recess 8a of the lens unit 8 is engaged by the top end of the hook 7. When the lens unit 8 is completely mounted on the lens board 6, a releasing member 40 supported by the hook 7 for horizontal movement is forced by a spring 41 to move to the left as viewed in FIG. 2, into engagement with and below a shoulder 6a of the lens board 6 at its lower hooked portion 40a. Due to this engagement between the shoulder 6a of the lens board 6 and the lower hooked portion 40a of the releasing member 40, the hook 7 is releasably prevented from being turned in the clockwise direction. When the releasing member 40 is in the FIG. 2 position wherein the lower hooked portion 40a is in engagement with and below the shoulder 6a of the lens board 6, a switch 42 is turned on to provide a signal.

For demounting the lens unit 8 from the lens board 6, the releasing lever 40 is moved to the right as viewed in FIG. 2 to disengage the lower hooked portion 40a of the releasing member 40 from the shoulder 6a of the lens board 6. Thereafter, the hook 7 is turned in the clockwise direction, allowing the lens unit 8 to be removed from the lens board 6 as is shown in FIG. 3.

Upon the removal of the lens unit 8, a lens unit detecting lever 43 having a pin 47 extending upwardly is moved by a spring 44 to the left as seen in FIG. 3 to project beyond a flange surface 45 of the lens board 6. As a result, the pin 47 can contact only the under surface of the hook 7; and this maintains the hook 7 swung up against the action of spring 38 as is shown in FIG. 3. At this time, as the releasing member 40 is maintained in its disengaged or rightward position through engagement between the lower hooked portion 40a of the releasing member 40 and the rear surface of the shoulder 6a of the lens board 6, the switch 42 is maintained turned off.

As was previously described, when the lens unit 8 is mounted on the lens board 6, the lens unit 8 is, after being engaged with the shoe of the lens board 6, pressed against the lens board 6. As a result, the rear surface 48 of a mounting flange of the lens unit 8 pushes back to the right the forward end 43a of the lens unit detecting lever 43 that projects beyond the flange surface 45 of the lens board 6, against the action of spring 44, thereby bringing the pin 47 of the lens unit detecting lever 43 into alignment with and below an engaging recess 49. When the pin is thus disposed under the recess 49, the hook 7 is able to turn in the counterclockwise direction under the action of the spring 38 to the FIG. 2 position so as to lock in place the lens unit 8. In this way, the mounting of lens unit 8 on the lens board 6 is completed.

Figure 4:
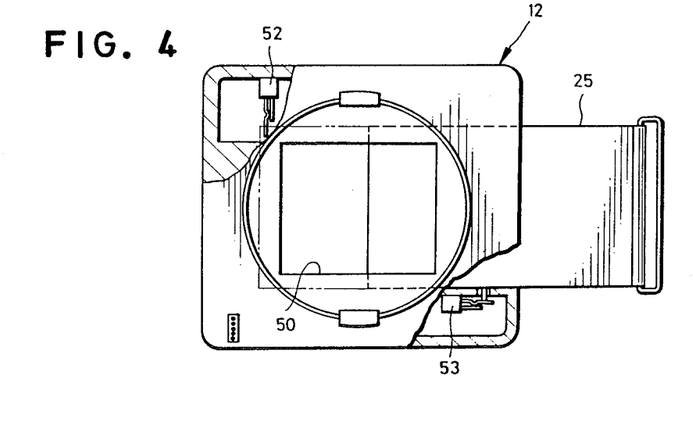
FIG. 4 is a partially sectioned schematic front view showing the camera back.

As is shown in FIG. 4, the camera back 12 has an exposure opening 50 formed in its front wall. The light-blocking plate 25 is removably inserted in any well known manner so as to block light from entering the camera back 12. For detecting positions of the light-blocking plate 25 in the camera back 12, there are normally closed leaf switch 52 and a normally open leaf switch 53 disposed approximately on the diagonal of the exposure opening 50. The light-blocking plate 25 turns the switch 52 off and the switch 53 on when fully inserted and, on the other hand, turns the switch 52 on and the switch 53 off when removed.

FIG. 5 shows the electric circuit of a camera embodying the present invention. The circuit comprises a circuit block A incorporated in the camera body 2, a circuit block B incorporated in the lens unit 8, and a circuit block C incorporated in the camera back 12. The circuit blocks B and C are electrically connected to the circuit block A through contacts 55 and 18, respectively. The circuit block A includes a micro-processor unit (which is hereinafter referred to as a camera-MPU) 60, a mirror control circuit 61 for controlling the operation of the motor 28, a mirror operation detecting circuit 62 which can detect the actuation of the mirror operating button 34, and a warning buzzer 63. The camera-MPU transfers signals both between itself and the circuit block B and between itself and the circuit block C so as to execute a sequential operation required for photographing and to check whether the various elements operate properly.

The circuit block B includes the shutter control circuit 15 controlling the motor 64 which drives the shutter driving mechanism 16. The signals from the switch 42 actuated by the releasing lever 40 of the hook 7 are transferred to the camera-MPU 60 through a connector 55.

The circuit block C includes a micro-processor unit (which is hereinafter referred to as a camera back-MPU) 65 for controlling electric signals from elements in the camera back 12, a film advance controlling circuit 21, a driver 66 for the liquid crystal display panel 23, the switch 52, a detecting circuit 68 for detecting the light-blocking plate 25 through the switch 52, and a film detecting circuit 69 adapted to detect infrared light which is projected from an infrared light emitter and received by an infrared light receiver after being reflected from the surface of the film.

An ordinary photographic sequence of operation of the camera is performed as described below. When the camera is placed in a viewing condition as shown in FIG. 1, the mirror 27 and the light-blocking plate 31 are in the down position and the shutter 14 is open. Therefore, light from an object to be photographed passes through the taking lens 13 and is reflected by the reflex mirror 27 to be directed to a focusing screen 35 so as to form an image of the object on the focusing screen 35.

When the camera-MPU 60 detects that the shutter release button 33 is operated, the camera-MPU 60 provides the shutter control circuit 15 with a shutter-closing signal. As a result, the shutter control circuit 15 actuates the motor 64, closing the shutter 14. Simultaneously with the closing of the shutter 14, a shutter-closed signal is provided and transferred to the camera-MPU 60. Due to the shutter-closed signal, the camera-MPU 60 actuates the motor 28 by the aid of the mirror control circuit 61, causing the mirror driving mechanism 30 to swing the reflex mirror 27 and the light-blocking plate 31 up to a photographing position.

When the reflex mirror 27 and the light-blocking plate 31 are moved to the photographing position, the camera-MPU 60 provides the shutter control circuit 15 with a signal for starting an exposure. As a result, the motor 64 is actuated to drive the shutter 14 through the shutter driving mechanism 16, thereby effecting an exposure. Upon the completion of exposure, the camera-MPU 60 receives a completion signal from the shutter control circuit 15 to supply the camera back-MPU 65 with a signal for advancing the film.

Due to the application of the film advancing signal, the film advancing control circuit 21 actuates the motor 20, thereby to operate the film advancing mechanism 22 to advance the film 11 by one frame. Upon the completion of this one-frame film advance, a film advance completion signal is delivered to the camera back-MPU 65 and the camera-MPU 60. The camera back-MPU 65 stops the film advancing control circuit 21 and, on the other hand, the camera-MPU 60 controls the mirror control circuit 61 to reverse the motor 28 so as to swing down the reflex mirror 27 and the light-blocking plate 31 to the viewing position. When the mirror and light-blocking plate are detected to be in the viewing position, the camera-MPU 60 actuates the shutter control circuit 15 to open the shutter 14. In this way, the photographing sequence is completed and the elements of the camera return to the viewing position as shown in FIG. 1.

When the camera is placed in viewing condition between exposures, because the light-blocking plate 31 is fully swung down to close or block the opening 32 completely, the film will not be exposed even if the lens unit 8 is detached. This allows one lens unit to be replaced by another lens unit.

If it is required to swing up the mirror 27 and the light-blocking plate 31 with the lens unit attached to the camera, the mirror swung up button 34 is operated. As a result of the operation of the mirror swing up button 34, a mirror up switch 72 is turned on and this is detected by an operation detecting circuit 62. If the operation detecting circuit 62 detects that the mirror up swing 72 has been turned on, the camera-MPU 60 provides the shutter control circuit 15 with a shutter close signal so as to close the shutter 14. The closing of the shutter 14 is detected as a shutter close signal by the camera-MPU 60 for allowing the reflex mirror 27 and the light-blocking plate 31 to swing up to the photographing position. At this time, the shutter 14 blocks light from entering the camera back 12, preventing the film 11 from being accidentally exposed. When, on the other hand, the mirror swing-up button 34 is returned to its normal position, the mirror up switch 72 is turned off, actuating the mirror control circuit 61 to reverse the motor 28 so as to swing down the reflex mirror 27 and the light-blocking plate 31 to the viewing position before the shutter 14 is re-opened.

Figure 6:
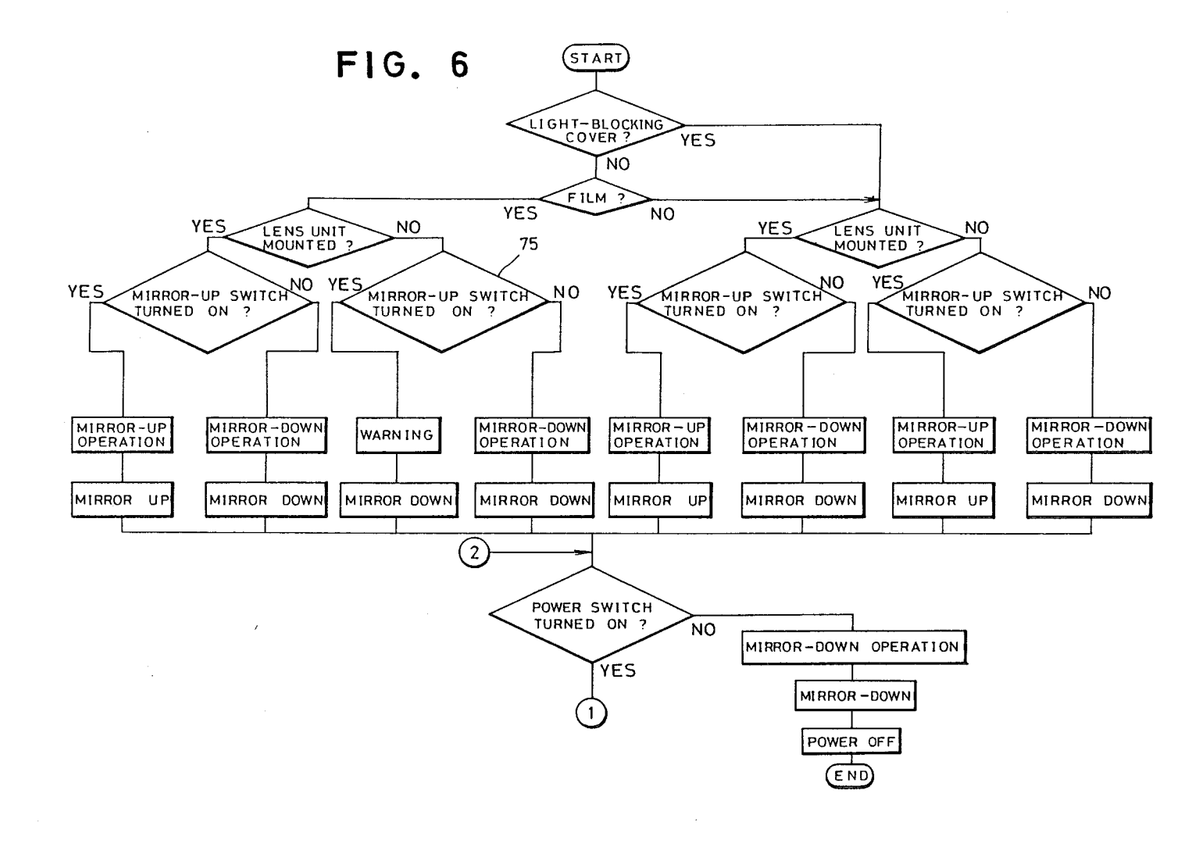
FIG. 6 is a flow chart showing a sequential operation for preventing the reflex mirror and the light-blocking plate from being swung up and placed in the photographing position.

When using the camera described above, even if any of various improper operations are performed, the film will not be accidentally exposed. Before operating the camera, the reflex mirror 27 and the light-blocking plate 31 are in place in the viewing position. As is shown in FIG. 6, if the lens unit 8 is detached from the lens board 6 after the supply of power, the removal of the lens unit 8 is detected by the switch 42. If the light-blocking plate 25 is not in place in the camera back 12 to close the exposure opening 50, this is detected by the detecting circuit 68. The fact that film is loaded in the camera back 12 is detected by the film detecting circuit 69; and so the camera-MPU 60 provides the mirror control circuit 61 with no signal for the swinging-up of the mirror 27 even though a decision that the mirror-up button 34 has been operated is made in step 75 (FIG. 6). At the same time, the buzzer 63 makes a warning sound and the liquid crystal display panel 23 makes a warning indication, while the reflex mirror 27 and the light-blocking plate 31 swing down to the viewing position. In other words, if no lens unit is attached to the lens board 6, the mirror swing-up operation is made ineffective so as to prevent the film 11 from being accidentally exposed directly to ambient light and a warning is given if the mirror swing-up operation is attempted.

Either when the detecting circuit 68 detects that the light-blocking plate 25 is fully inserted in the camera back 12 or when the film detecting circuit 69 detects that no film is loaded in the camera back 12, the reflection mirror 27 and the light-blocking plate 31 can be swung up and down by the operation of the mirror swing-up button 34 regardless of whether the lens unit 8 is mounted on the lens board 6. Furthermore, if the power supply swing of the camera is turned off with the reflex mirror 27 and the light-blocking plate 31 left swung up to the photographing position, power is actually cut off after the reflex mirror 27 and the light-blocking plate 31 have been swung down to the viewing position. Therefore, just after the initiation of the camera operation which is induced by supplying power, the reflex mirror 27 and the light-blocking plate 31 are maintained in the viewing position, which is the swung-down position.

Figure 7:
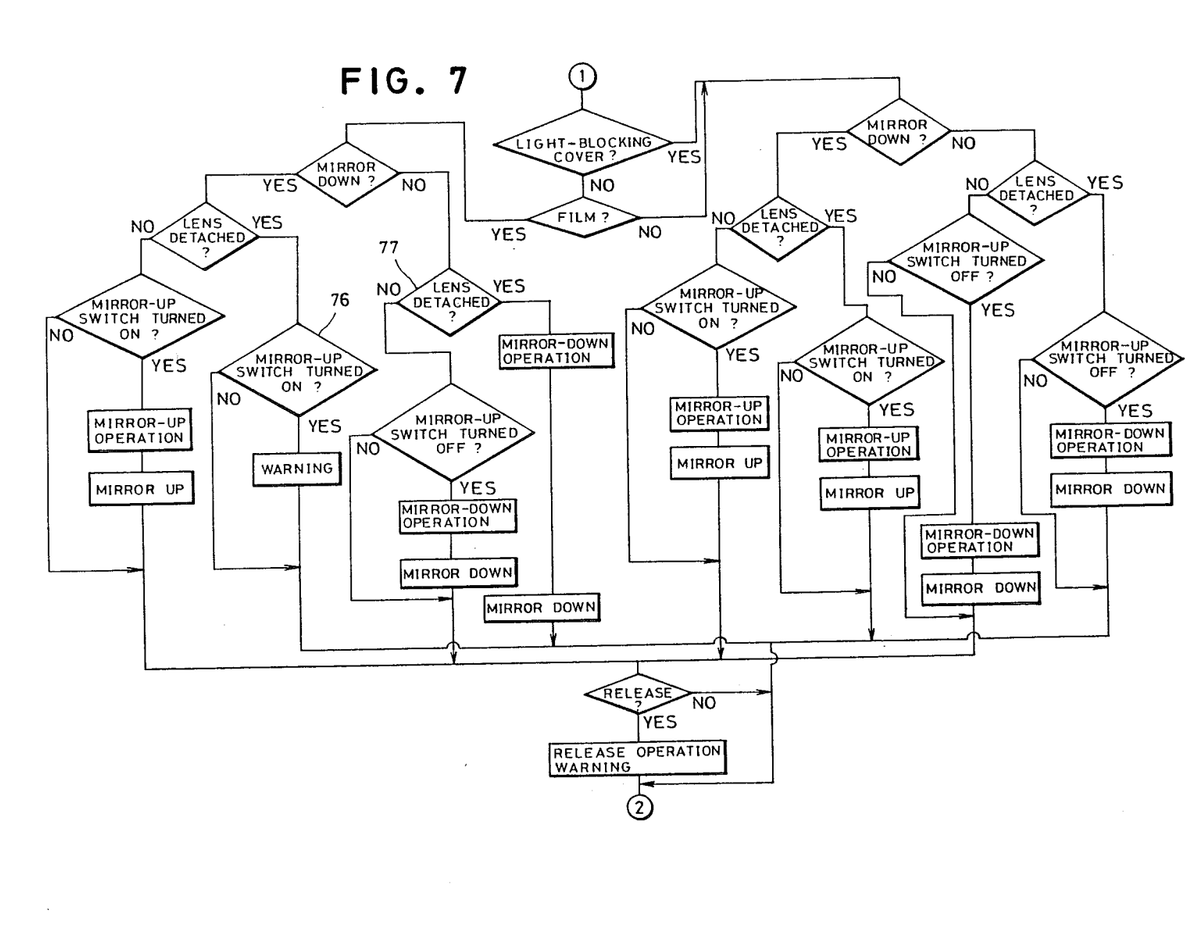
FIG. 7 is a flow chart showing a sequential operation for quickly swinging down and placing the reflex mirror and the light-blocking plate in the viewing position when the lens unit is detached.

As long as the power switch is maintained turned on, the sequential operation shown in FIG. 7 is repeatedly executed. Specifically, if the mirror-up operation is detected while the lens unit 8 is detached, the reflex mirror 27 and the light-blocking plate are actually prevented from swinging up and warnings are given in the same way as described previously. Furthermore, if any operation of detaching the lens unit 8 from the lens board 6 is detected at step 77 (FIG. 7) while the reflex mirror 27 and the light-blocking plate 31 are in the swung up position or the photographing position, the reflex mirror-27 and the light-blocking plate 31 are urgently swung down to the viewing position even though the mirror-up button 34 is placed in its operated position.

In more detail: when the lens unit 8 is detached from the lens board 6, releasing lever 40 of the hook 7 is at first operated to slide to the right, so as to turn the switch 42 off. Simultaneously with the turning off of the switch 42, the camera-MPU 60 receives a turn-off signal from the switch 42 and actuates the mirror control circuit 61 to cause the motor 28 to rotate, swinging down the reflex mirror 27 and the light-blocking plate 31 by the aid of the mirror driving mechanism 30. Because at the moment the switch 42 is turned off, the lens unit has not been fully detached from the lens board 6, the mirror 27 and the light-blocking plate 31 have been swung down before the lens unit is fully detached from the lens board 6. Therefore, no accidental film exposure has occurred.

When the light-blocking plate 25 is fully inserted in the camera back 12, the operation of the mirror-up button 34 can cause the reflex mirror 27 and the light-blocking plate 31 to swing up regardless of whether the lens unit is attached. Therefore, by maintaining the switch 52 turned off by inserting the light-blocking plate 25 in the camera back 12, the reflex mirror 27 and the light-blocking plate 31 can be swung up and down for the purpose of demonstration.

Moreover, when using a lens unit which is not specially configured as an interchangeable lens unit, for example a lens having a long flange back, it is necessary to insert the light-blocking plate 25 in the camera back 12 so as to allow the reflex mirror 27 and the light-blocking plate 31 to be swung down before attaching the lens to the lens board 6. For attaching the lens to the lens board 6, an adapter ring which has the same mounting as the lens units 8 is used. After completion of the attaching of this adapter, the lens unit detecting lever 43 is turned to allow the hook 7 to engage the adapter in the same way as the lens unit 8. Since the reflex mirror 27 and the light-blocking plate 31 can be maintained swung up by operation of the mirror-up button 34 even when the light-blocking plate 25 is pulled out after the adapter has been attached to the lens board 6, a shutter of the lens attached to the lens board 6 through the adapter can be manually operated to make an exposure.

The sequential operation shown in FIG. 7 is repeatedly executed while power is continuously supplied. Therefore, for example, at the moment the light-blocking plate 25, which has been inserted to close the opening 50 in order to detach the lens unit 8, is slightly pulled out and thereby the switch 52 is turned on, the swung-up reflex mirror 27 and light-blocking plate 31 are forced to swing down to the viewing position so as to prevent the film 11 from being accidentally exposed.

In the execution of the sequential operations shown in FIGS. 6 and 7, when effecting steps following the step 75 of FIG. 6 or the steps 76 and 77 of FIG. 7, there occurs an inconsistency between positions of the manually operated mirror-up button 34 and the reflex mirror 27 and the light-blocking plate 31 which may prove puzzling to the photographer. For this reason, it is desirable to provide means such as an electromagnet which acts to force the mirror-up button 34 to return to its normal position when the steps following the steps 75 of FIG. 6 or the steps 76 and 77 of FIG. 7 are effected.

Although the present invention has been fully described by way of preferred embodiments thereof with reference to the accompanying drawings, it is to be noted that various changes and modifications will be apparent to those skilled in the art. Therefore, unless otherwise such changes and modifications depart from the scope of the present invention as defined by the appended claims, they should be construed as included therein.

What is claimed is:

1. In a single lens reflex camera comprising a camera body having a reflex mirror and a light-blocking plate which are pivotally mounted in said camera body for vertical swinging movement between a viewing position wherein said reflex mirror and light-blocking plate are disposed in a photographic optical path of the camera and a photographing position wherein said reflex mirror and light-blocking plate are out of said photographic optical path, and a lens unit having a shutter which is detachably mounted on said camera body; the improvement comprising:
   a driving mechanism including an electric motor for vertically swinging said reflex mirror and light-blocking plate between said viewing and photographing positions;
   manually operable mirror swing-up means for forcing said driving mechanism to swing up said mirror and plate and thereby placing said mirror and plate in said photographing position; and
   switch means operated by detaching said lens unit from said camera body for forcing said driving mechanism to swing down said reflex mirror and light-blocking plate into said viewing position independently of said manually operable mirror swing-up means when said reflex mirror and light-blocking plate have been placed in said photographing position.

2. A single lens reflex camera as defined in claim 1, wherein said switch means is maintained operated in the absence of a said lens unit on said camera body so as to disable said driving mechanism in order to maintain said reflex mirror and light-blocking plate swung down and disposed in said viewing position even though said manually operable mirror swing-up means is operated.

3. A single lens reflex camera as defined in claim 2, further comprising means for giving a warning when said driving mechanism is disabled independently of any operation of said manually operable mirror swing-up means.

4. In a single lens reflex camera comprising a camera body having a reflex mirror and a light-blocking plate which are pivotally mounted in the camera body for vertical swinging movement between a viewing position wherein said reflex mirror and light-blocking plate are disposed in a photographic optical path of the camera and a photographing position wherein said reflex mirror and light-blocking plate are out of said photographic optical path, a lens unit having a shutter which is detachably mounted on said camera body, and a camera back detachably mounted on said camera body which is formed with an exposure opening and has a removable light-blocking cover plate for covering the exposure opening; the improvement comprising:
   a driving mechanism including an electric motor for vertically swinging said reflex mirror and light-blocking plate between said viewing and photographing positions;
   manually operable mirror swing-up means for forcing said driving mechanism to swing up said mirror and plate and thereby placing said mirror and plate in said photographing position;
   first switch means operated upon detaching said lens unit from said camera body; and
   second switch means for detecting whether said light-blocking cover plate is inserted in said camera back to cover said exposure opening;
   said driving mechanism being forced to swing down and thereby place said reflex mirror and light-blocking plate in said viewing position upon an operation of said first switch means independently of said manually operative mirror swing-up means when said second switch means detects no light-blocking cover plate, and being operated to place said reflex mirror and light-blocking plate in either one of said viewing and photographing positions according to operating conditions of said manually operable mirror swing-up means when said second switch means detects said light-blocking cover plate.

* * * * *